United States Patent
Chen et al.

(10) Patent No.: US 11,286,431 B2
(45) Date of Patent: Mar. 29, 2022

(54) FLUID CATALYTIC CRACKING PROCESSES AND APPARATUS

(71) Applicant: LUMMUS TECHNOLOGY LLC, Bloomfield, NJ (US)

(72) Inventors: Liang Chen, Houston, TX (US); Peter Loezos, Houston, TX (US); Bryan Tomsula, Houston, TX (US); Rama Rao Marri, Bloomfield, NJ (US); Zan Liu, Houston, TX (US)

(73) Assignee: LUMMUS TECHNOLOGY LLC, Houston, TX (US)

( * ) Notice: Subject to any disclaimer, the term of this patent is extended or adjusted under 35 U.S.C. 154(b) by 93 days.

(21) Appl. No.: 16/918,479

(22) Filed: Jul. 1, 2020

(65) Prior Publication Data
US 2021/0002564 A1    Jan. 7, 2021

Related U.S. Application Data

(60) Provisional application No. 62/869,748, filed on Jul. 2, 2019.

(51) Int. Cl.
| | | |
|---|---|---|
| C10G 51/04 | (2006.01) | |
| B01J 8/18 | (2006.01) | |
| C10G 11/18 | (2006.01) | |
| B01J 8/32 | (2006.01) | |

(52) U.S. Cl.
CPC ............ C10G 51/04 (2013.01); B01J 8/1809 (2013.01); B01J 8/1863 (2013.01); B01J 8/1881 (2013.01); B01J 8/32 (2013.01); C10G 11/182 (2013.01); C10G 11/187 (2013.01); B01J 2208/00548 (2013.01); B01J 2208/00991 (2013.01);

(Continued)

(58) Field of Classification Search
CPC .... C10G 11/182; C10G 11/187; C10G 51/04; C10G 2300/4093; C10G 2300/701; C10G 2400/20; B01J 8/1809; B01J 8/1863; B01J 8/1881; B01J 8/32; B01J 2208/00548; B01J 2208/00991
USPC .......................................................... 208/74
See application file for complete search history.

(56) References Cited

U.S. PATENT DOCUMENTS

| 4,374,750 A | 2/1983 | Vickers et al. |
| 4,431,749 A | 2/1984 | Hettinger, Jr. et al. |
| 4,536,281 A | 8/1985 | Hettinger, Jr. et al. |

(Continued)

FOREIGN PATENT DOCUMENTS

| EP | 0197486 A2 | 10/1986 |
| EP | 0325437 A2 | 7/1989 |
| WO | 2010/067379 A2 | 6/2010 |

*Primary Examiner* — Brian A Mccaig
(74) *Attorney, Agent, or Firm* — Osha Bergman Watanabe & Burton LLP

(57) ABSTRACT

Apparatus and processes herein provide for converting hydrocarbon feeds to light olefins and other hydrocarbons. The processes and apparatus include a conventional riser reactor in combination with a mixed flow (e.g., including both counter-current and co-current catalyst flows) fluidized bed reactor designed for maximizing light olefins production. The effluents from the riser reactor and mixed flow reactor are processed in a catalyst disengagement vessel, and the catalysts used in each reactor may be regenerated in a common catalyst regeneration vessel. Further, integration of the two-reactor scheme with a catalyst cooler provides a refinery the flexibility of switching the operation between the two-reactor flow scheme, a catalyst cooler only flow scheme, or using both simultaneously.

13 Claims, 6 Drawing Sheets

(52) U.S. Cl.
CPC .......... *C10G 2300/4093* (2013.01); *C10G 2300/701* (2013.01); *C10G 2400/20* (2013.01)

(56) References Cited

U.S. PATENT DOCUMENTS

| | | | |
|---|---|---|---|
| 4,624,773 A | 11/1986 | Hettinger, Jr. et al. |
| 4,923,834 A | 5/1990 | Lomas |
| 5,001,097 A | 3/1991 | Pecoraro |
| 5,071,806 A | 12/1991 | Pecoraro |
| 5,160,601 A | 11/1992 | Pecoraro |
| 5,314,610 A | 5/1994 | Gartside |
| 5,376,608 A | 12/1994 | Wormsbecher et al. |
| 5,482,617 A | 1/1996 | Collins et al. |
| 5,534,135 A | 7/1996 | Dai et al. |
| 5,637,207 A | 6/1997 | Hsing et al. |
| 5,702,589 A | 12/1997 | Tsang et al. |
| 5,944,982 A | 8/1999 | Lomas |
| 5,972,205 A | 10/1999 | Tsang et al. |
| 6,106,697 A | 8/2000 | Swan et al. |
| 6,149,875 A | 11/2000 | Rao et al. |
| 6,358,486 B1 | 3/2002 | Shan et al. |
| 6,482,315 B1 | 11/2002 | Roberie et al. |
| 6,656,347 B2 | 12/2003 | Stockwell et al. |
| 6,809,055 B2 | 10/2004 | Overbeek et al. |
| 6,852,214 B1 | 2/2005 | Chester et al. |
| 6,869,521 B2 | 3/2005 | Lomas |
| 6,916,757 B2 | 7/2005 | Ziebarth et al. |
| 6,930,219 B2 | 8/2005 | Shan et al. |
| 6,943,132 B2 | 9/2005 | Stockwell et al. |
| 7,087,155 B1 | 8/2006 | Dath et al. |
| 7,128,827 B2 | 10/2006 | Tallman et al. |
| 7,268,265 B1 | 9/2007 | Stewart et al. |
| 7,314,963 B2 | 1/2008 | Voskoboynikov et al. |
| 7,323,099 B2 | 1/2008 | Henry |
| 7,347,929 B2 | 3/2008 | Vierheilig et al. |
| 7,375,257 B2 | 5/2008 | Dath et al. |
| 7,381,322 B2 | 6/2008 | Pankaj et al. |
| 7,479,218 B2 | 1/2009 | Letzsch |
| 7,591,939 B2 | 9/2009 | Benham |
| 7,611,622 B2 | 11/2009 | Niccum et al. |
| 7,632,977 B2 | 12/2009 | Mo et al. |
| 7,658,837 B2 | 2/2010 | Soares Cerqueira et al. |
| 9,452,404 B2 | 9/2016 | Marri et al. |
| 2006/0231461 A1 | 10/2006 | Mo et al. |
| 2007/0205139 A1 | 9/2007 | Kulprathipanja et al. |
| 2018/0079973 A1 | 3/2018 | Chen et al. |

FLUID CATALYTIC CRACKING PROCESSES AND APPARATUS

FIELD OF THE DISCLOSURE

Embodiments herein generally relate to systems and processes for enhancing the productivity and/or flexibility of hydrocarbon processing using mixed catalyst systems. Some embodiments disclosed herein relate to a fluid catalytic cracking system allowing flexibility in plant operations for the conversion of hydrocarbon feedstocks, such as for the conversion of vacuum gas oil and/or heavy oil residues into very high yield of light olefins, such as propylene and ethylene, aromatics, and gasoline with high octane number.

BACKGROUND

In recent times, production of light olefins via fluid catalytic cracking (FCC) processes has been considered one of the most attractive propositions. Additionally, there is an ever increasing demand for petrochemical building blocks such as propylene, ethylene, and aromatics (benzene, toluene, xylenes, etc.). Further, integration of petroleum refineries with a petrochemicals complex has become a preferred option for both economic and environmental reasons.

Global trends also show that there is increased demand for middle distillates (diesel) than that of gasoline product. In order to maximize middle distillates from FCC process, it is required to operate FCC at lower reactor temperature and a different catalyst formulation. The downside of such change is decreased light olefins yield because of FCC unit operating at much lower reactor temperature. This will also reduce feedstock for Alkylation units.

Several fluidized bed catalytic processes have been developed over the last two decades, adapting to the changing market demands. For example, U.S. Pat. No. 7,479,218 discloses a fluidized catalytic reactor system in which a riser-reactor is divided into two sections of different radii in order to improve the selectivity for light olefins production. The first part of the riser reactor with lesser radii is employed for cracking heavy feed molecules to naphtha range. The enlarged radii portion, the second part of the riser reactor is used for further cracking of naphtha range products into light olefins such as propylene, ethylene, etc. Though the reactor system concept is fairly simple, the degree of selectivity to light olefins is limited for the following reasons: (1) the naphtha range feed streams contact partially coked or deactivated catalyst; (2) the temperature in the second part of the reaction section is much lower than the first zone because of the endothermic nature of the reaction in both sections; and (3) lack of the high activation energy required for light feed cracking as compared to that of heavy hydrocarbons.

Other patents and publications related to fluid catalytic cracking units may include U.S. Pat. Nos. 6,106,697, 7,128, 827, and 7,323,099, 7,658,837, US2007/0205139, WO2010/ 067379, U.S. Pat. Nos. 6,869,521, 7,611,622, 5,944,982, US20060231461, U.S. Pat. Nos. 6,149,875, and 7,381,322, among others.

Various patents have also discussed limitations of FCC units, noting that the capacity of FCC units may be limited by the regenerator operating at a temperature which approaches the metallurgy design limits. Hot regenerated catalyst may be cooled in a "catalyst cooler" by generating steam, for example, or by performing endothermic reactions, such as dehydrogenation of alkanes. For example, various patents discussing operation of a catalyst cooler may include EP0325437, EP0197486, U.S. Pat. Nos. 4,923,834, and 4,374,750, among others.

SUMMARY

It has been found that it is possible to use a two-reactor scheme to crack hydrocarbons, including cracking of a $C_4$, lighter $C_5$ fraction, naphtha fraction, methanol, etc. for the production of light olefins, where the two-reactor scheme does not have limitations on selectivity and operability, meets heat balance requirements, and also maintains a low piece count. It has also been found that flexibility in plant operations may be gained by integrating the two-reactor scheme of embodiments herein with a catalyst cooler.

Select embodiments disclosed herein use a conventional riser reactor in combination with a mixed flow (e.g., including both counter-current and co-current catalyst flows) fluidized bed reactor designed for maximizing light olefins production. The effluents from the riser reactor and mixed flow reactor are processed in a common catalyst disengagement vessel, and the catalysts used in each of the riser reactor and the mixed flow reactor may be regenerated in a common catalyst regeneration vessel. This flow scheme is effective for maintaining a high cracking activity, overcomes the heat balance problems, and also improves yield and selectivity of light olefins from various hydrocarbon streams, yet simplifies the product quenching and unit hardware, as will be described in more detail below. Further, integration of the two-reactor scheme with a catalyst cooler provides a refinery the flexibility of switching the operation between the two-reactor flow scheme, a catalyst cooler only flow scheme, or using both simultaneously.

In one aspect, embodiments disclosed herein relate to a system for processing hydrocarbons. The system may include a riser reactor configured to contact a mixture of first particles and second particles with a hydrocarbon feedstock to convert at least a portion of the hydrocarbon feedstock and to recover a riser reactor effluent comprising mixed hydrocarbons and the mixture of the first and second particles. The first particles may have a smaller average particle size and/or may be less dense than the second particles. Further, the first particles and second particles may independently be catalytic or non-catalytic particles. The system may also include a reactor configured to contact a mixture including the first particles and the second particles with a second hydrocarbon feedstock to convert at least a portion of the second hydrocarbon feedstock. The reactor may be fluidly connected to: an overhead product line for recovering from the reactor a reactor effluent comprising first particles, a first portion of the second particles, and hydrocarbons; a bottoms product line for recovering from the reactor a second stream comprising a second portion of the second particles. A particle separator may be configured to separate second particles from the reactor effluent, and to produce a hydrocarbon effluent comprising the hydrocarbons and the first particles and a second stream comprising the separated second particles. A feed line may be provided for returning the separated second particles from the particle separator to the reactor. A separation system may be configured to receive the hydrocarbon effluent and the riser reactor effluent and to separate: (i) the first particles from the hydrocarbons in the hydrocarbon effluent, and (ii) the mixture of first and second particles from the mixed hydrocarbons in the riser reactor effluent, producing (a) a combined hydrocarbon effluent stream and (b) a mixture of first and second particles. The system may also include a regenerator for regenerating the mixture of first and second particles recovered in the separation system. Additionally, the system may include a particle cooler configured to exchange heat between a heat exchange medium and, alternately, intermittently, or at the same time, (i) hot regenerated particles from the catalyst regenerator comprising a mixture of first and second particles, and (ii) second catalyst particles recovered via the bottoms product line. Further, a flow line may be provided for recovering cooled particles from the particle cooler and feeding the cooled particles to the regenerator.

In another aspect, embodiments disclosed herein relate to a process for the conversion of hydrocarbons. The process may include feeding a hydrocarbon feedstock and a mixture of first particles and second particles to a riser reactor. The first particles may have a smaller average particle size and/or may be less dense than the second particles, and the first particles and second particles may independently be catalytic or non-catalytic particles. The mixture of first and second particles may be contacted with the second hydrocarbon feedstock to crack the hydrocarbon feedstock and form a riser reactor effluent comprising hydrocarbons and a mixture of first and second particles. The riser reactor effluent may be fed to a separator to separate the first and second particles from the hydrocarbons, thereby recovering a hydrocarbon product from the separator. The separated first and second particles may be fed to a regenerator for regenerating the first and second particles. During a first period of time, regenerated first particles and second particles from the regenerator may be fed to a reactor. A hydrocarbon feedstock may also be fed to the reactor. In the reactor, the hydrocarbon feedstock may be contacted with the regenerated first and second particles, recovering an overhead product from the reactor comprising a converted hydrocarbon effluent, at least a portion of the second particles, and the first particles. The second particles may be separated from the overhead product to provide a first stream comprising the first particles and the converted hydrocarbon effluent and a second stream comprising the separated second particles. The first stream may be fed to the separator. The separated second particle in the second stream may be returned to the reactor. During a second period of time, regenerated first particles and second particles from the regenerator may be fed to a particle cooler. In the particle cooler, heat may be exchanged between a heat exchange medium and the regenerated first particles and second particles, recovering cooled particles from the particle cooler and feeding the cooled particles to the regenerator.

Other aspects and advantages will be apparent from the following description and the appended claims.

DETAILED DESCRIPTION

Figure 1:
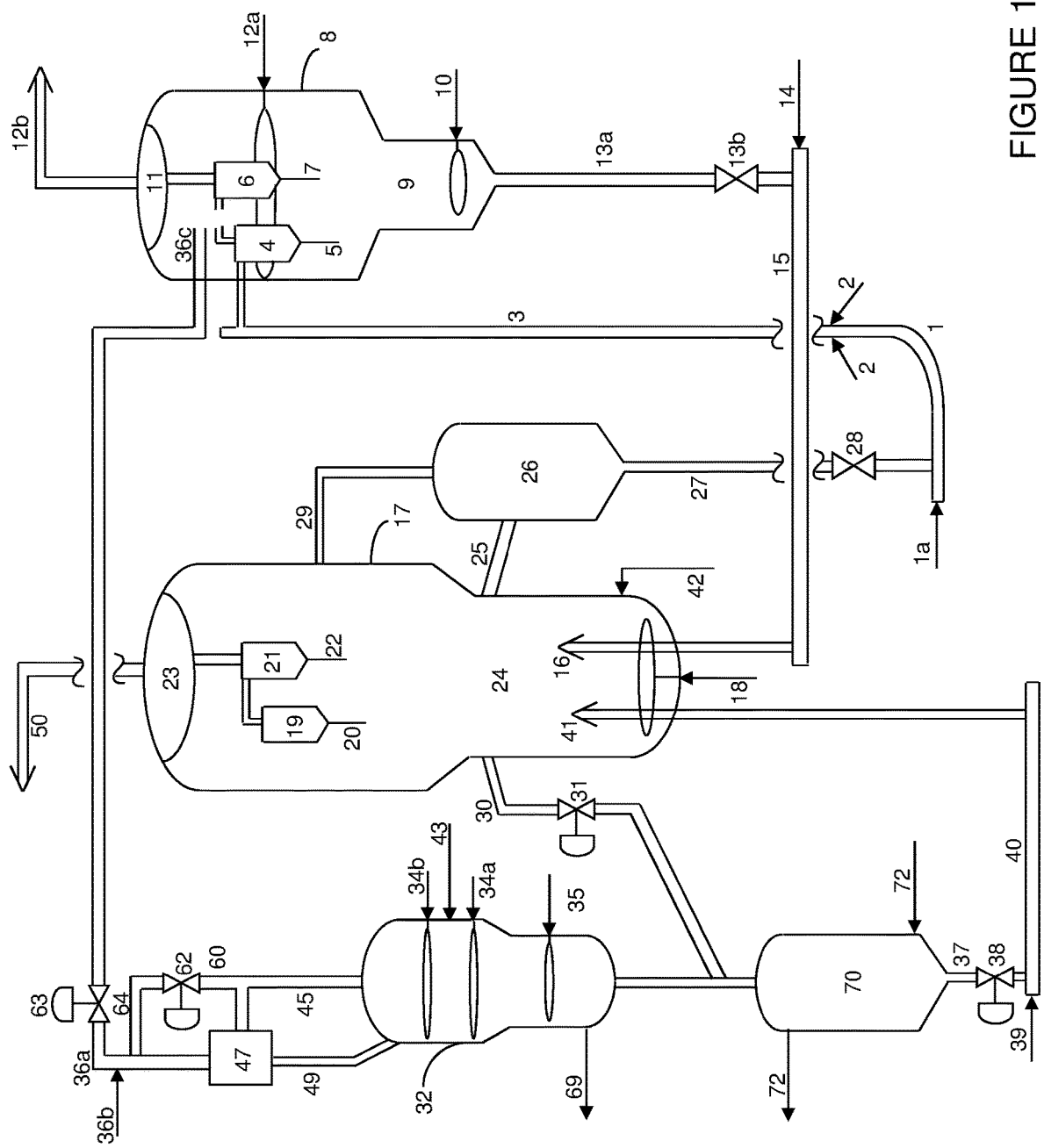
FIG. 1 is a simplified process flow diagram of a system for cracking hydrocarbons and producing light olefins according to one or more embodiments disclosed herein.

As used herein, the terms "catalyst" and "particle" and like terms may be used interchangeably. Summarized above, and as further described below, embodiments herein separate mixed particulate materials based on size and/or density to achieve an advantageous effect in a reactor system. The particles or particulate materials used to facilitate catalytic or thermal reaction may include catalysts, absorbents, and/or heat transfer materials having no catalytic activity, for example.

In one aspect, embodiments herein relate to a fluid catalytic cracking apparatus and processes for flexibly converting hydrocarbon feedstocks, such as light hydrocarbons (ethane, propane, butanes), medium hydrocarbons (C5-C9 hydrocarbons, for example), as well as for the conversion of heavy hydrocarbon feeds, such as vacuum gas oil and/or heavy oil residues. Systems and processes herein may produce very high yield of light olefins, such as propylene and ethylene, aromatics and gasoline with high octane number or middle distillates, while concurrently minimizing the yield of heavier products. To accomplish this goal, a secondary reactor, which may be a mixed flow reactor (including both co-current and counter-current flow of particles with respect to vapor flow in some embodiments) or a catalyst- or particle-concentrating reactor (selectively removing a smaller or less dense portion of the mixed particles/catalysts), can be integrated with a conventional fluid catalytic cracking reactor, such as a riser reactor.

A heavy hydrocarbon feed is catalytically cracked to naphtha, middle distillates and light olefins in the riser reactor, which is a pneumatic flow co-current type reactor. To enhance the yields and selectivity to light olefins (ethylene and propylene), cracked hydrocarbon products from the riser reactor, such as $C_4$ and naphtha range hydrocarbons (olefins and paraffins), may be processed in the secondary reactor (the mixed flow reactor or the concentrating reactor). Alternatively, or additionally, external feed streams, such as $C_4$, naphtha, or other hydrocarbon fractions from other processes such as a steam cracker, metathesis reactor, or delayed coking unit, and naphtha range streams, such as straight run naphtha or from delayed coking, visbreaking or natural gas condensates, among other hydrocarbon feedstocks, may be processed in the secondary reactor to produce light olefins, such as ethylene and propylene. The integration of the secondary reactor with a conventional FCC riser reactor according to embodiments disclosed herein may overcome the drawbacks of prior processes, may substantially increase the overall conversion and light olefins yield, and/or may increases the capability to process heavier feedstocks.

Integration of the secondary reactor with a conventional FCC riser reactor according to embodiments disclosed herein may be facilitated by (a) using a common regeneration vessel, (b) using two types of catalyst, one being selective for cracking heavier hydrocarbons and the other being selective for the cracking of $C_4$ and naphtha range hydrocarbons for the production of light olefins, and (c) using a mixed flow reactor or a concentrating reactor in a flow regime that will partially separate the two types of catalysts, favoring the contact of the $C_4$s or naphtha feed with the catalyst selective for cracking the same and producing light olefins.

To enhance the operation window of the secondary reactor, and to provide greater process flexibility, the secondary reactor may be operated in a flow regime to entrain the catalyst selective for cracking heavier hydrocarbons, and to entrain a portion of the catalyst selective for the cracking of $C_4$ and naphtha range hydrocarbons. The cracked hydrocarbon products and the entrained catalysts are then fed to a separator to separate the catalyst selective for the cracking of $C_4$ and naphtha range hydrocarbons from the cracked hydrocarbon products and the catalyst selective for cracking heavier hydrocarbons. This solids separation vessel is an external vessel to the reactor and is operated at hydrodynamic properties that enhance the separation of the two types of catalyst based on their physical properties, such as particle size and/or density. The separated catalyst, selective for the cracking of $C_4$ and naphtha range hydrocarbons, may then be returned to the reactor for continued reaction and providing an enhanced concentration of the catalyst selective for the cracking of $C_4$ and naphtha range hydrocarbons within the reactor, improving selectivity of the overall process while also improving the overall process flexibility due to the enhanced operating window.

Availability of feedstocks, demand for particular products or product mixtures, as well as maintenance requirements may require further process flexibility. Systems herein additionally provide a particle or catalyst cooler, which may be fluidly connected to both the regeneration vessel and the secondary reactor. A flow control system and associated valving may be provided to selectively direct a flow of: (a) mixed particles from the regenerator to the particle cooler, (b) mixed particles from the regenerator to the reactor, and/or (c) larger and/or more dense particles from the secondary reactor to the particle cooler. The particle cooler may exchange heat between a heat exchange medium and, intermittently or at the same time, (i) hot regenerated particles from the catalyst regenerator, and (ii) larger and/or more dense particles recovered from the secondary reactor. The resulting cooled particles or cooled catalyst may then be fed to the regenerator. Cooled particles from the particle cooler may aid in cooling and controlling the temperature of regeneration occurring in the regenerator, thus helping to maintain the regenerator at operating temperatures well below metallurgy design limits.

As noted above, the cracking system may utilize two types of catalysts, each favoring a different type of hydrocarbon feed. The first cracking catalyst may be a Y-type zeolite catalyst, an FCC catalyst, or other similar catalysts useful for cracking heavier hydrocarbon feedstocks. The second cracking catalyst may be a ZSM-5 or ZSM-11 type catalyst or similar catalyst useful for cracking $C_4$s or naphtha range hydrocarbons and selective for producing light olefins. To facilitate the two-reactor scheme disclosed herein, the first cracking catalyst may have a first average particle size and density, and may be smaller and/or lighter than those for the second cracking catalyst, such that the catalysts may be separated based on density and/or size (e.g., based on terminal velocity or other characteristics of the catalyst particles).

In the catalyst regeneration vessel, spent catalyst recovered from both the riser reactor and the secondary reactor is regenerated. Following regeneration, a first portion of the mixed catalyst may be fed from the regeneration vessel to a riser reactor (co-current flow reactor). A second portion of the mixed catalyst may be fed from the regeneration vessel to either or both the secondary reactor or the particle cooler.

In the co-current flow (riser) reactor, a first hydrocarbon feed may be contacted with a first portion of the regenerated catalyst to crack at least a portion of the hydrocarbons to form lighter hydrocarbons. An effluent may then be recovered from the co-current flow reactor, the effluent comprising a first cracked hydrocarbon product and a spent mixed catalyst fraction.

When in use, the secondary reactor may be operated in a fluidization regime sufficient to entrain the first cracking catalyst, and the second cracking catalyst with the hydrocarbon products recovered as an effluent from the secondary reactor overhead outlet. In other embodiments, the secondary reactor is operated in a fluidization regime sufficient to entrain the first cracking catalyst and a portion of the second cracking catalyst with the hydrocarbon products recovered as an effluent from the secondary reactor overhead outlet. The effluent is then fed to a separator to separate the cracked hydrocarbon products and the first cracking catalyst from the second cracking catalyst. The vapor/first cracking catalyst stream recovered from the separator may then be forwarded for separation. The second cracking catalyst recovered from the separator may be recycled back to the secondary reactor for continued reaction, as noted above.

The first effluent (cracked hydrocarbons and spent mixed catalyst from the riser reactor) and the second effluent (cracked hydrocarbons and separated first cracking catalyst from the secondary reactor) may both be fed to a disengagement vessel to separate the spent mixed catalyst fraction and the separated first cracking catalyst from the first and second cracked hydrocarbon products. The cracked hydrocarbon products, including light olefins, $C_4$ hydrocarbons, naphtha range hydrocarbons, and heavier hydrocarbons may then be separated to recover the desired products or product fractions.

When in use, the particle cooler may receive hot mixed particles from the regenerator and/or the larger or more dense particles from the secondary reactor. The particles may be fed, for example, through heat exchange tubes, while a heat exchange medium, such as air, water, steam, heat exchange oils, or hydrocarbon feedstocks to be preheated, may be passed over and across the heat exchange tubes, exchanging heat with the particles. In some embodiments, the particle cooler may be a helically baffled heat exchanger. Other types of particle coolers or catalyst coolers may also be used. Following cooling, as noted above, the particles may be returned to the regenerator to help maintain a temperature of the contents in the regenerator.

Thus, processes disclosed herein integrate a secondary mixed-flow or catalyst-concentrating reactor, external solids separator, a particle cooler, and a riser reactor, with common product separations and regeneration, where the catalysts or particles concentrated in the secondary reactor may be highly selective for cracking $C_4$ and naphtha range hydrocarbons to produce light olefins. The common regeneration provides for heat balance, and the common product separation (disengagement vessel, etc.) provides for simplicity of operations and reduced piece count, among other advantages. Further, flexibility of process operations is provided for switching the operations for use of the particle cooler only, the secondary reactor only, or using both of them at the same time.

Referring now to FIG. 1, a simplified process flow diagram of systems for cracking hydrocarbons and producing light olefins according to embodiments disclosed herein is illustrated. The system includes a two-reactor configuration for maximizing yield of propylene and ethylene from petroleum residue feedstocks or other hydrocarbon streams. The first reactor 3 may be a riser reactor for cracking heavier hydrocarbon feeds, for example. The second reactor 32 is a fluidized bed reactor, which may be equipped with baffles or internals. The $C_4$ olefins and/or light naphtha products from the first reactor 3 or similar feed streams from external sources may be processed in the second reactor 32 to enhance the yield of light olefins, including propylene and ethylene, and aromatics/high octane gasoline.

A heavy petroleum residue feed is injected through one or more feed injectors 2 located near the bottom of first reactor 3. The heavy petroleum feed contacts hot regenerated catalyst introduced through a J-bend 1. The catalyst fed to the first reactor 3 is a catalyst mixture, including a first catalyst selective for cracking heavier hydrocarbons, such as a Y-type zeolite based catalyst, and a second catalyst selective for the cracking of $C_4$ and naphtha range hydrocarbons for the production of light olefins, such as a ZSM-5 or ZSM-11, which may also be used in combination with other catalysts. The first and second catalysts may be different in one or both particle size and density. A first catalyst, such as the Y-type based zeolite, may have a particle size in the range of 20-200 microns and an apparent bulk density in the range of 0.60-1.0 g/ml. A second catalyst, such as ZSM-5 or ZSM-11, may have a particle size in the range of 20-350 microns and an apparent bulk density in the range of 0.7-1.2 g/ml. (While operation of the system is described for FIG. 1 with respect to catalyst, non-catalytic particles may also be used to provide thermal cracking of the feedstocks.)

The heat required for vaporization of the feed and/or raising the temperature of the feed to the desired reactor temperature, such as in the range from 500° C. to about 700° C., and for the endothermic heat (heat of reaction) may be provided by the hot regenerated catalyst coming from the regenerator 17. The pressure in first reactor 3 is typically in the range from about 1 barg to about 5 barg.

After the major part of the cracking reaction is completed, the mixture of products, unconverted feed vapors, and spent catalyst flow into a two stage cyclone system housed in cyclone containment vessel 8. The two-stage cyclone system includes a primary cyclone 4, for separating spent catalyst from vapors. The spent catalyst is discharged into stripper 9 through primary cyclone dip leg 5. Fine catalyst particles entrained with the separated vapors from primary cyclone 4 and product vapors from second reactor 32, introduced via flow line 36*a* and a single stage cyclone 36*c*, are separated in second stage cyclone 6. The catalyst mixture collected is discharged into stripper 9 via dip leg 7. The vapors from second stage cyclone 6 are vented through a secondary cyclone outlet 12*b*, which may be connected to plenum 11, and are then routed to a main fractionator/gas plant (not shown) for recovery of products, including the desired olefins. If necessary, the product vapors are further cooled by introducing light cycle oil (LCO) or steam via distributor line 12*a* as a quench media.

The spent catalyst recovered via dip legs 5, 7 undergoes stripping in stripper bed 9 to remove interstitial vapors (the hydrocarbon vapors trapped within the pores of the catalyst particles) by countercurrent contacting of steam, introduced to the bottom of stripper 9 through a steam distributor 10. The spent catalyst is then transferred to regenerator 17 via the spent catalyst standpipe 13*a* and lift line 15. Spent catalyst slide valve 13*b*, located on spent catalyst standpipe 13*a* is used for controlling catalyst flow from stripper 9 to regenerator 17. A small portion of combustion air or nitrogen may be introduced through a distributor 14 to help smooth transfer of spent catalyst.

Coked or spent catalyst from lift line 15 is discharged through spent catalyst distributor 16 into a dense regenerator bed 24. Combustion air is introduced by an air distributor 18 located at the bottom of regenerator bed 24. Coke deposited on the catalyst is then burned off in regenerator 17 via reaction with the combustion air. Regenerator 17, for example, may operate at a temperature in the range from about 640° C. to about 750° C. and a pressure in the range from about 1 barg to about 5 barg. The catalyst fines entrained along with flue gas are collected in first stage cyclone 19 and second stage cyclone 21 and are discharged into the regenerator catalyst bed through respective dip legs 20, 22. The flue gas recovered from the outlet of second stage cyclone 21 is directed to flue gas line 50 via regenerator plenum 23 for downstream waste heat recovery and/or power recovery.

A first part of the regenerated catalyst mixture is withdrawn via regenerated catalyst standpipe 27, which is in flow communication with J bend 1. The catalyst flow from regenerator 17 to reactor 3 may be regulated by a slide valve 28 located on regenerated catalyst standpipe 27. The opening of slide valve 28 is adjusted to control the catalyst flow to maintain a desired top temperature in reactor 3.

In addition to lift steam, a provision is also made to inject feed streams such as $C_4$ olefins and naphtha or similar external streams as a lift media to J bend 1 through a gas distributor 1*a* located at the Y-section for enabling smooth transfer of regenerated catalyst from J bend 1 to reactor 3. J bend 1 may also act as a dense bed reactor for cracking $C_4$ olefins and naphtha streams into light olefins at conditions favorable for such reactions, such as a WHSV of 0.5 to 50 $h^{-1}$, a temperature of 640° C. to 750° C., and residence times from 3 to 10 seconds.

A second part of the regenerated catalyst mixture is withdrawn through a standpipe 30. A slide valve 31 may be used to control the catalyst flow from regenerator 17. Following withdrawal, the mixed catalyst may flow through standpipe 30 into a second reactor 32, a particle cooler 70, or both, depending upon the operation of other valves within the system, such as valve 63 or valve 38, described further below.

Two-Reactor Mode

In a first mode of operation, second reactor only, the mixed catalyst may flow from regenerator 17 and be directed to second reactor 32. In this mode, valve 38 may be closed, while valve 63 is open. The flow rate of catalyst may be, for example, based on a vapor outlet (line 45) temperature set point. $C_4$ olefins and naphtha streams are injected into the bottom section of the catalyst bed through one or more feed distributors 34 (34*a*, 34*b*), either in liquid or vapor phase. Second reactor 32 operates in a mixed flow fashion, where a portion of the regenerated catalyst flows downward (from the top to the bottom of the reactor bed) and a portion of the regenerated catalyst mixture and the feed hydrocarbon stream flows upward (from the bottom to the top of the reactor bed).

Second reactor 32 may be equipped with baffles or structured internals (not shown) that help intimate contact and mixing of catalyst and feed molecules. These internals may also help in minimizing channeling, bubble growth, and/or coalescence. Second reactor 32 may also be enlarged at different sections along the length to maintain a constant or desired superficial gas velocity within the sections.

The concentrated particles accumulating in second reactor 32 may be stripped, intermittently or continuously, at the bottommost portion of second reactor 32 to separate entrained hydrocarbon feed/products using steam as a stripping media introduced through distributor 35. If desired, spent particles may be withdrawn from second reactor 32 via flow line 69.

As described above, spent catalyst from both reactors 3, 32 is regenerated in the common regenerator 17, which may operate in a complete combustion mode. Mixed catalyst is received from reactor 3 and the smaller and/or lighter particles are received from second reactor 32 via flow line 36*a*, each being stripped in stripper 9 and commonly fed to regenerator 17 via lift pipe 15.

As noted above, second reactor 32 utilizes two different catalysts that may differ in one or both of particle size and density, such as a lighter and smaller Y-type zeolite or FCC catalyst and a larger and/or denser ZSM-5/ZSM-11 shape-selective pentacil small pore zeolite. The superficial gas velocity in second reactor 32 is maintained such that essentially all or a large portion of the lighter, smaller catalyst (e.g., Y-type zeolite/FCC catalyst) and a portion of the heavier, larger catalyst (e.g., ZSM-5/ZSM-11) is carried out of the reactor with the cracked hydrocarbons and steam recovered via flow line 45. A portion of the larger and/or denser catalyst may be retained within the reactor 32, forming a dense bed toward the lower portion of the reactor, as noted above.

The effluent from reactor 32 recovered via flow line 45 may thus include cracked hydrocarbon products, unreacted hydrocarbon feedstock, steam (stripping media), and a catalyst mixture, including essentially all of the lighter and/or smaller catalyst and a portion of the larger and/or more dense catalyst introduced to the reactor. The effluent may then be transported via flow line 45 to a solids separator 47. Separator 47 may be a separator configured to separate the two types of catalyst based on their physical properties, namely particle size and/or density. For example, separator 47 may use differences in inertial forces or centrifugal forces to separate FCC catalyst from the ZSM-5. The solids separation vessel 47 is an external vessel to the second reactor 32 and is operated at hydrodynamic properties that enhance the separation of the two types of catalyst based on their physical properties.

After separation in separator 47, the smaller and/or lighter catalyst (Y-type zeolite/FCC catalyst) is then transported from separator 47 to the common disengager or containment vessel 8, housing the riser reactor cyclones and/or reaction termination system, via outlet line 36a. The larger and/or denser catalyst (ZSM-5/ZSM-11) may be returned via flow line 49 to the mixed flow reactor 32 for continued reaction with hydrocarbon feeds introduced through distributors 34.

Entrainment of essentially all of the lighter/smaller catalyst and a portion of the larger and/or more dense catalyst, subsequent separations, and recycle of the larger and/or denser catalyst to reactor 32 may allow for a significant accumulation of the larger and/or denser catalyst in reactor 32. As this catalyst is more selective for the cracking of $C_4$ and naphtha range hydrocarbons, the accumulation of the larger and/or denser catalyst may provide a selectivity and yield advantage. Further, operation of the reactor in a fluidization flow regime to entrain both types of catalyst may provide for improved operability of the reactor or flexibility in operations, as discussed above.

A hydrocarbon feed such as heavy vacuum gas oil or heavy residue feed, light cycle oil (LCO), or steam may be injected as a quench media in the outlet line 36a through a distributor 36b. The flow rate of such quench media may be controlled by setting the temperature of the stream entering the containment vessel 8. All the vapors from second reactor 32, including those fed through distributor 36b, are discharged into the dilute phase of containment vessel 8 through a single stage cyclone 36c. Employing a hydrocarbon feed as a quench media is preferred as it serves dual purpose of cooling the products from second reactor 32 and also enhances the production of middle distillates.

The first stage reactor 3, such as a riser reactor, may operate in the fast fluidization regime (e.g., at a gas superficial velocity in the range from about 3 to about 10 m/s at the bottom section) and pneumatic transport regime (e.g., at a gas superficial velocity in the range from about 10 to about 20 m/s) in the top section.

WHSV in second reactor 32 is typically in the range from about 0.5 $h^{-1}$ to about 50 $h^{-1}$; vapor and catalyst residence times may vary from about 2 to about 20 seconds. When different feeds are introduced, preferably the $C_4$ feed is injected at an elevation below naphtha feed injection. However, interchanging of feed injection locations is possible.

As necessary, make-up catalyst may be introduced via one or more flow lines 42, 43. For example, fresh or make-up FCC or Y-type zeolite catalyst or a mixture of these two may be introduced to regenerator 17 via flow line 42 and fresh or make-up ZSM-5/ZSM-11 catalyst may be introduced to second reactor 32 via flow line 43. Overall system catalyst inventory may be maintained by withdrawing mixed catalyst from regenerator 24, for example. Catalyst inventory and accumulation of the preferred catalyst within reactor 32 may be controlled, as will be described below, via control of the reactor and separator 47 operations.

In some embodiments, a first part of the regenerated catalyst is withdrawn from regenerator 17 into a Regenerated Catalyst (RCSP) hopper 26 via withdrawal line 25, which is in flow communication with regenerator 17 and regenerated catalyst standpipe 27. The catalyst bed in the RCSP hopper 26 floats with regenerator 17 bed level. The regenerated catalyst is then transferred from RCSP hopper 26 to reactor 3 via regenerated catalyst standpipe 27, which is in flow communication with J bend 1. The catalyst flow from regenerator 17 to reactor 3 may be regulated by a RCSP slide valve 28 located on regenerated catalyst standpipe 27. A pressure equalization line 29 may also be provided.

A separator bypass line 60 may also be used to facilitate the transfer of particles from the top of reactor 32 to the vessel 8, such as illustrated in FIG. 1. As described with respect to FIG. 1 above, second reactor 32 utilizes two different catalysts that may differ in one or both of particle size and density, such as a lighter and/or smaller Y-type zeolite or FCC catalyst and a larger and/or denser ZSM-5/ZSM-11 shape-selective pentacil small pore zeolite. The superficial gas velocity in second reactor 32 may be maintained such that essentially all of the lighter, smaller catalyst (e.g., Y-type zeolite/FCC catalyst) and a portion of larger and/or more dense catalyst (e.g., ZSM-5/ZSM-11) is carried out of the reactor with the cracked hydrocarbons and steam recovered via flow line 45.

The effluent from reactor 32 recovered via flow line 45 may thus include cracked hydrocarbon products, unreacted hydrocarbon feedstock, steam (stripping media), and a catalyst mixture, including essentially all of the lighter, smaller catalyst and a portion of the larger and/or more dense catalyst introduced to the reactor. The effluent may then be transported via flow line 45 to a solids separator 47. Separator 47 may be a separator configured to separate the two types of catalyst based on their physical properties, namely particle size and/or density. The separator 47 is operated at hydrodynamic properties that enhance the separation of the two types of catalyst based on their physical properties.

After separation in separator 47, the smaller/lighter catalyst (Y-type zeolite/FCC catalyst) is then transported from separator 47 to the common disengager or containment vessel 8, housing the riser reactor cyclones and/or reaction termination system, via outlet line 36a. The larger and/or denser catalyst (ZSM-5/ZSM-11) may be returned to the mixed flow reactor 32 for continued reaction with hydrocarbon feeds introduced through distributors 34.

Continuously or intermittently, a portion of the effluent containing both types of catalysts being transported via flow line 45 may be diverted to bypass the separator 47. The diverted portion of the effluent may flow around separator 47 via flow line 60, which may include a diverter or flow control valve 62. The effluent may then continue via flow line 64 back to disengager 8 for separation of the hydrocarbon products from the catalysts. Flow line 64 may be combined with the effluent and smaller catalyst recovered from separator 47 via flow line 36a, and may be introduced either upstream or downstream of quench 36b. Alternatively, the diverted effluent in line 60 may be fed directly to disengager/containment vessel 8.

While illustrated in FIG. 1 with a diverter valve 62, embodiments herein contemplate use of y-shaped flow conduit or similar apparatus to continuously send a portion of the effluent, containing both catalyst particle types, to disengager 8, while continuously sending a portion of the effluent to separator 47, thus allowing for the desired accumulation of the larger and/or denser catalyst particles within reactor 32.

The use of increased flow of carrier fluid and/or the use of a flow diverter, as described above, may beneficially provide for the accumulation of the catalyst selective for cracking naphtha range hydrocarbons in the second reactor, reactor 32.

One Reactor+Catalyst Cooler Mode

In a second mode of operation, one reactor plus catalyst cooler, the mixed catalyst may be directed flow from regenerator 17 to particle cooler 70. In this mode, valve 38 may be open, while valve 63 is closed. The flow rate of catalyst through standpipe 30 into particle cooler 70 may be, for example, based on one or more of a temperature of the regenerator 17 or of an outlet temperature of heat exchange medium 72, exchanging heat directly or indirectly with catalyst flowing through the particle cooler 70, among other possible control variables.

In some embodiments, particle cooler 70 is a helically baffled heat exchanger, where the catalyst particles traverse the tube side of the heat exchanger, while the heat exchange medium 72 traverses the tube side of the heat exchanger. The catalyst particles may then be recovered via flow line 37. The catalyst can then be transferred via line 37, slide valve 38 and transfer line 40 to the regenerator 17. Blower air may be used as carrier gas 39 to transfer the catalyst to regenerator 17. The use of the particle cooler 70 may be beneficial, as noted above, to maintain a temperature of the regenerator, as well as to provide heat to one or more process or utility streams in the plant.

Two-Reactor+Particle Cooler Mode

In a third mode of operation, two reactor plus particle cooler, the mixed catalyst may flow from regenerator 17 to both second reactor 32 and particle cooler 70. In this mode, valves 38 and 63 may both be open, and a portion of the mixed catalyst from standpipe 30 may be directed to second reactor 32 and a remaining portion may be directed to particle cooler 70. The particle cooler and second reactor operations are as described above for the first two modes, providing, in this mode, both hydrocarbon conversion (via second reactor 32) and cooling of the regenerator contents (via particle cooler 70).

During this mode, valve 38 is controlled to allow a portion of mixed catalyst from Regenerator 17 to enter particle cooler 70, for example, based on a set point of the temperature of exit steam 72. The valve 31, for example, typically controlled by vapor outlet temperature (line 45), would allow for a large mixed catalyst flow from Regenerator 17 to both second reactor 32 and particle cooler 70. The rate of this catalyst flow is usually larger than that of the catalyst flow to particle cooler 70 based on the control scheme. After filling particle cooler 70, the extra mixed catalyst would flow to the second reactor 32. An additional lift steam, located at the transfer line below the second reactor 32, may be used in order to facilitate the transfer of the mixed catalyst flow to the second reactor 32.

Figure 2:
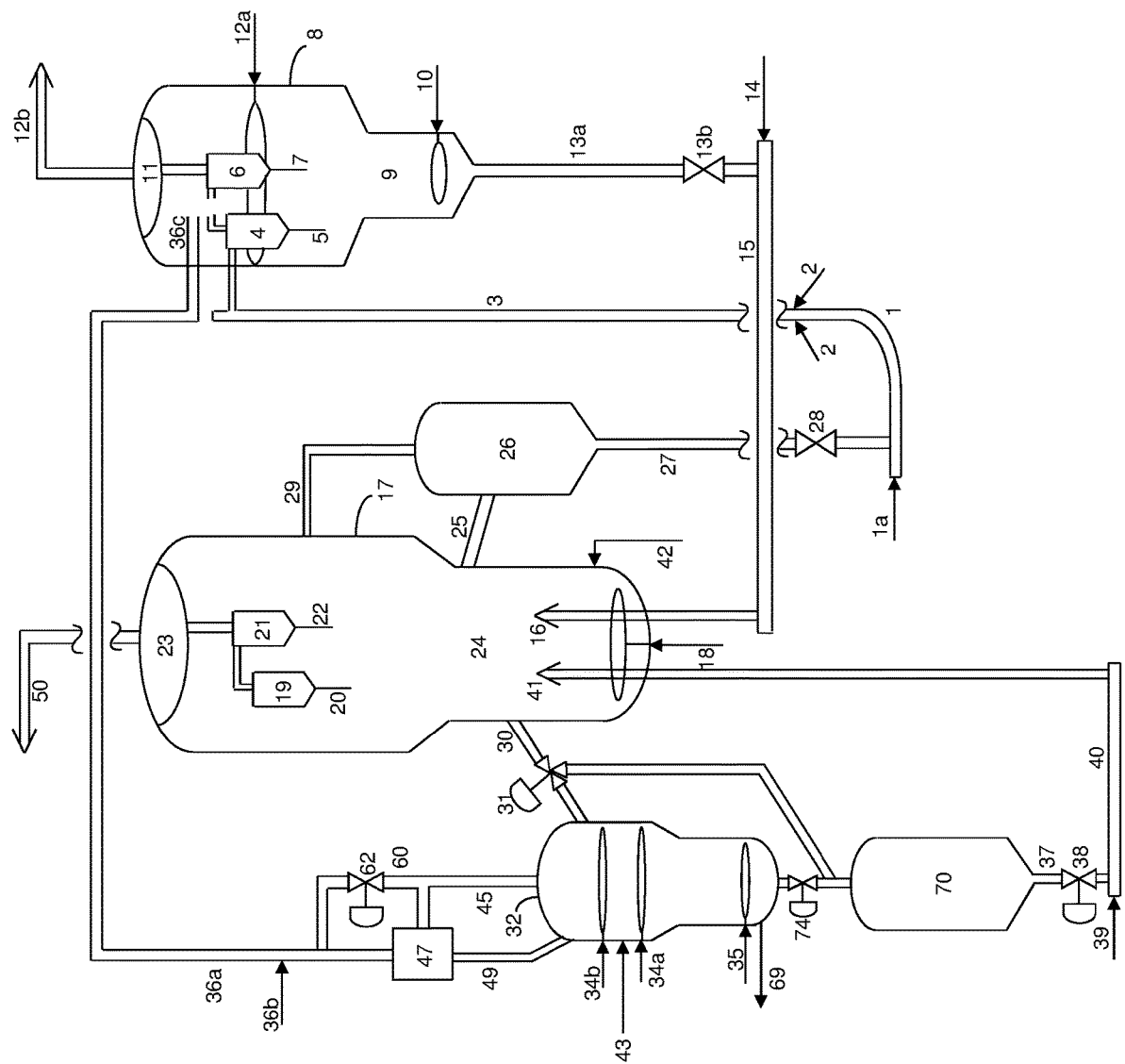
FIG. 2 is a simplified process flow diagram of a system for cracking hydrocarbons and producing light olefins according to one or more embodiments disclosed herein.

Referring now to FIG. 2, a simplified process flow diagram of systems for cracking hydrocarbons and producing light olefins according to embodiments disclosed herein is illustrated, where like numerals represent like parts. Similar to the process scheme illustrated in FIG. 1, described above, the system as illustrated in FIG. 2 includes two reactors and a particle cooler, and introduce two kinds of particles (such as a lighter and/or smaller Y-type or FCC catalyst and a larger and/or denser ZSM-5 or ZSM-11 catalyst) in the secondary reactor 32, in the particle cooler 70, or both.

In this embodiment, flow control valve 31 is a three-way valve, which may be used to direct catalyst to second reactor 32 for two-reactor operation mode, or to particle cooler 70 for one reactor plus particle cooler mode. While illustrated as a three-way valve, two separate standpipes 30 may also be used to individually provide catalyst flow to each of second reactor 32 and particle cooler 70.

As noted above, spent particles at the bottom of second reactor 32 may be withdrawn via flow line 69. As illustrated in FIG. 2, the particle cooler 70 may also be used to both recover heat from the spent particles concentrated in second reactor 32, and/or to facilitate transport of the larger or more dense particles from reactor 32 to the regenerator 17 for regeneration and continued use in converting hydrocarbons.

The concentrated particles accumulating in second reactor 32 may be stripped at the bottommost portion of second reactor 32 to separate entrained hydrocarbon feed/products using steam as a stripping media introduced through distributor 35. Flow control valve 74 may be provided to intermittently or continuously withdraw particles from a bottom of second reactor 32. The spent catalyst recovered at the bottom of reactor 32 may then be then transferred to regenerator 17 via particle cooler 70, standpipe 37 and lift line 40 through a spent catalyst distributor 41. Combustion air or nitrogen may be introduced through distributor 39 to enable smooth transfer of catalyst to regenerator 17. Slide valve 38 may be used to control the catalyst flow from second reactor 32 to regenerator 17. Spent catalyst from both reactors 3, 32 is then regenerated in the common regenerator 17, which may operate in a complete combustion mode.

In operation, the catalyst bed in the secondary reactor vessel 32 is expected to operate in turbulent bed, bubbling bed or fast fluidization regimes. A light naphtha feed 34a, such as the light naphtha product from a primary reactor or riser reactor 3, as illustrated, may be fed into the secondary reactor 32 and converted to light olefins in the presence of the mixed catalyst. The lifting gas along with product gas in the vessel 32 will lift the solids, including both catalysts, through the pipe 45 to the solids separation vessel 47, then back to the regenerator 17. Due to the differences in size and/or density of the two catalyst particles, most of the ZSM-5 or ZSM-11 catalyst particles will be separated from the Y-type or FCC catalyst in the solids separation vessel 47 and transferred via return line 49 back to the reactor 32. Most of Y-type or FCC catalyst particles will be transferred back to the stripper 8 for gas solid separation.

Steam 35, along with the hydrocarbon feeds 34a, 34b, may be used as a lifting gas. The catalyst may fill up the reactor 32 and in some embodiments no catalyst bed level is observed. The lifting gas along with product gas in the vessel 32 will lift the solids, including both catalysts, through the pipe 45 to the solids separation vessel 47. Due to the differences in size and/or density of the two catalyst particles, most of the ZSM-5 or ZSM-11 catalyst particles will be separated from the Y-type or FCC catalyst in the solids separation vessel 47 and transferred via return line 49 back to the reactor 32. Most of Y-type or FCC catalyst particles will be transferred back to the stripper 8 for gas solid separation.

As described above, systems according to embodiments herein may include a separator 47 configured to separate the two types of catalysts based on their physical properties, such as particle size and/or density. Separator 47 may be a cyclone separator, a screen separator, mechanical sifters, a gravity chamber, a centrifugal separator, a baffle chamber, a louver separator, an in-line or pneumatic classifier, or other types of separators useful for efficiently separating particles based on size and/or hydrodynamic properties.

Figure 3:
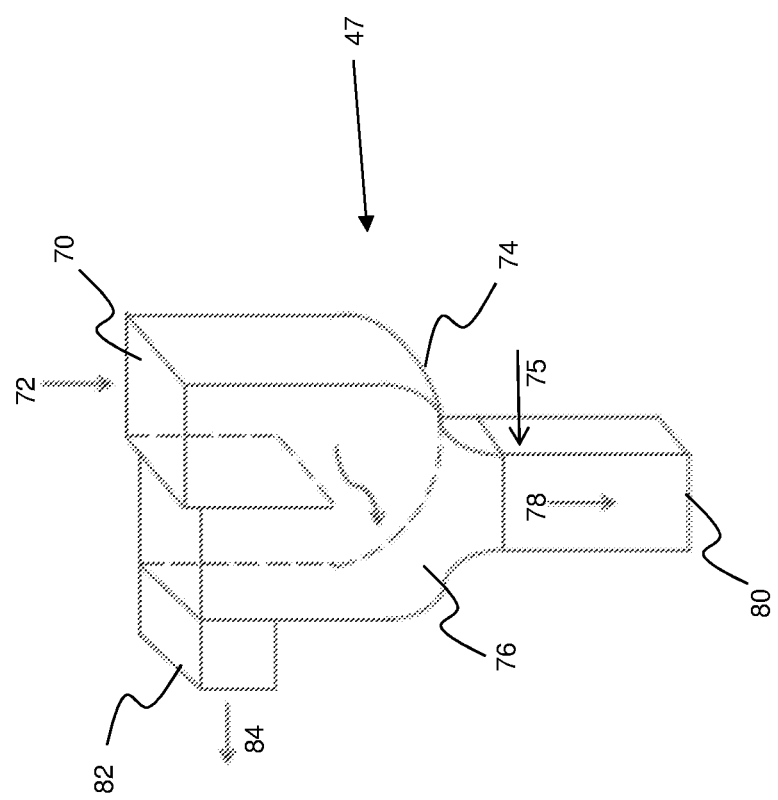
FIGS. 3-6 are simplified process flow diagrams of separators useful in systems according to one or more embodiments disclosed herein.

Examples of separators or classifiers useful in embodiments herein are illustrated in FIGS. 3-6. In some embodiments, separator 47 may be a U-shaped inertial separator, as illustrated in FIG. 3, to separate two kinds of solid particles or catalysts with different particle sizes and/or particle density. The separator may be built in the form of U-shape, having an inlet 70 at the top, a gas outlet 84 at the other end of the U, and a main solid outlet 80 at the base of U-shaped separator.

A mixture 72 of solid particles or catalysts with different sizes is introduced along with a carrier gas stream through inlet 70 and inertial separation forces are applied on the solids by making no more than one turn to separate the different sizes of solid particles. Larger and/or more dense solid particles 78 preferentially go downward in sections 74/76 to a standpipe or dipleg 80 connected to the base of U-shape while lighter or smaller solid particles are preferentially carried along with the gas stream to outlet 82, where the mixture 84 of small particles and gases may be recovered. The solid outlet 80 at the base of U-shaped separator (the inlet of the standpipe or dipleg used to flow the larger and/or more dense catalyst particles back to the second reactor 32) should be large enough to accommodate the normal solid/catalyst flow.

By controlling the gas flow rates entering the downward standpipe and exiting the main gas stream outlet, the overall separation efficiency of the U-shape inertial separator and the selectivity to separate larger and/or more dense particles from smaller and/or less dense particles can be manipulated. This extends to a fully sealed dipleg where the only gas stream exiting the dipleg are those entrained by the exiting solid/catalyst flow. As the U-shaped inertial separator provides the ability to manipulate the separation efficiency, intermediate sized particles, which have the potential to accumulate in the system as noted above, may be periodically or continuously entrained with the hydrocarbon products recovered from separator 47 for separation in vessel 8 and regeneration in regenerator 24.

In some embodiments, a gas sparger 75 or extra steam/inert gas may be provided proximate a top of outlet section 80, such as near a top of the standpipe inlet. The additional lift gas provided within the separator may further facilitate the separation of larger and/or more dense solid particles from less dense and/or smaller solid particles, as the extra gas may preferentially lift lighter solid particles to gas outlet 84, resulting in better solid classification.

The cross sectional area of the U-shaped separator at the inlet 70, outlet 82 and throughout the U-shaped separator (including areas 74, 76) may be adjusted to manipulate the superficial gas velocity within the apparatus to control the separation efficiency and the selectivity. In some embodiments, a position of one or more of the separator walls may be adjustable, or a movable baffle may be disposed within one or more sections of the separator, which may be used to control the separation efficiency and selectivity. In some embodiments, the system may include a particle size analyzer downstream of outlet 82, enabling real-time adjustment of the flow configuration through the U-shaped separator to effect the desired separations.

Utilization of U-shaped inertial separators connected in series or a combination of U-shape inertial separators and cyclones may provide flexibility to allow simultaneously achievement of both target overall separation efficiency and target selectivity of larger and/or more dense particles over smaller and/or less dense particles.

The secondary reactor 32 may also be equipped with baffles or structured internals such as modular grids as described in U.S. Pat. No. 7,179,427. Other types of internals that enhance contact efficiency and product selectivity/yields may also be used. The internals may enhance the catalyst distribution across the reactor and improve the contact of feed vapors with catalyst, leading to an increase in the average reaction rate, enhance the overall activity of the catalyst and optimize the operating conditions to increase the production of light olefins.

Embodiments disclosed herein use Y-type zeolite or conventional FCC catalyst, maximizing the conversion of heavy hydrocarbon feeds. The Y-type zeolite or FCC catalyst is of a smaller and/or lighter particle size than the ZSM-5 or similar catalysts used to enhance the production of light olefins in the countercurrent flow reactor. The ZSM-5 or similar catalysts have a larger particle size and/or are more dense than the Y-type zeolite or FCC catalysts used to enhance separations of the catalyst types in each of the mixed flow reactor and the solids separator. The superficial gas velocity of vapors in the second reactor is maintained such that it allows entrainment of the Y-type zeolite or FCC catalyst and a portion of the ZSM-5 or ZSM-11 catalyst out of the mixed flow reactor, and the solids separator may utilize the differences in single particle terminal velocities or differences between minimum fluidization/minimum bubbling velocities to separate and return the ZSM-5/ZSM-11 to the mixed flow reactor. This concept allows the elimination of two stage FCC systems and hence a simplified and efficient process. The catalysts employed in the process could be either a combination of Y-type zeolite/FCC catalyst and ZSM-5 or other similar catalysts, such as those mentioned in U.S. Pat. Nos. 5,043,522 and 5,846,402.

The entrainment of both catalysts from the mixed flow reactor, subsequent separation, and recycle and accumulation of the ZSM-5/ZSM-11 catalyst in the mixed flow reactor eliminates any potential restriction on superficial gas velocity in the secondary reactor. The use of a solids separation vessel thus provides process flexibility in the secondary reactor, allowing the secondary reactor to be operated in bubbling bed, turbulent bed, or fast fluidization regimes, rather than restricting the operations to only a bubbling bed regime. The solids separation vessel may be a cyclone or other vessel where solids and gases are introduced at a common inlet, and through degassing, inertial and centrifugal forces, the particles are separated based on size and/or density, with the majority of the smaller FCC type particles entraining with the vapor outlet, and the larger and/or denser ZSM-5 or ZSM-11 type particles returning via a dense phase standpipe or dipleg back to the secondary reactor vessel 32.

Figure 4:
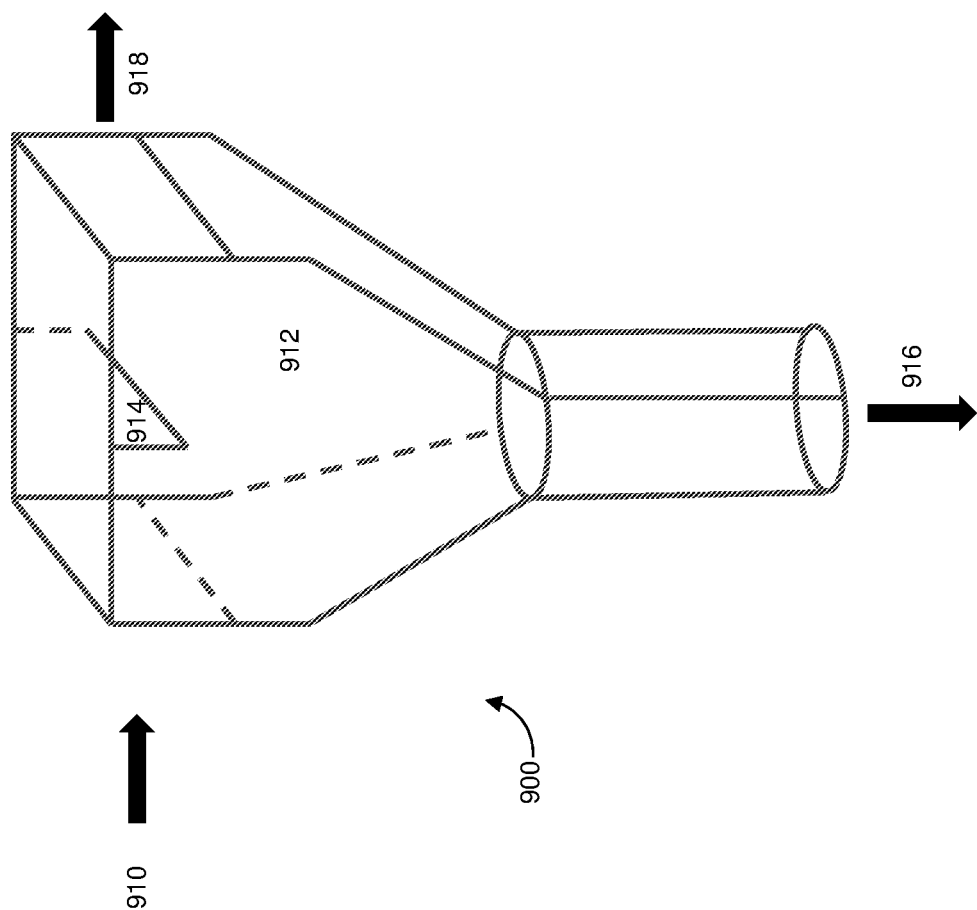

In addition to the U-type particle separator described in relation to FIG. 3, FIGS. 4-6 illustrate various additional particle separation devices for use in embodiments herein. Referring to FIG. 4, a baffle chamber separator 900 for separating catalysts or other particles based on size and/or density may include an inlet 910, such as a horizontal conduit. The vapors and particles contained in the horizontal conduit then enter a chamber 912, before being deflected by a baffle 914. The chamber 912 is connected to a first vertical outlet 916 and a first horizontal outlet 918. The baffle 914 may be located in the middle of chamber 912, proximate the inlet 910, or proximate the horizontal outlet 918 of the chamber. The baffle may be at an angle or moveable such that the baffle may be used to deflect more or less catalyst particles, and may be configured for a particular mixture of particles.

Processes herein may utilize the baffle chamber separator 900 to segregate larger and/or denser particles from smaller and/or less dense particles contained in a carrier gas, such as a hydrocarbon reaction effluent. The baffle chamber separator 900 may be configured to: separate at least a portion of a second particle type from the carrier gas and a first particle type, recover the second particle type via the first vertical outlet 916 and recover a mixture including the carrier gas and the first particle type via the first horizontal outlet 918. The separator may also include a distributor (not illustrated) disposed within or proximate the first vertical outlet for introducing a fluidizing gas, facilitating additional separation of the first particle type from the second particle type.

Figure 5:
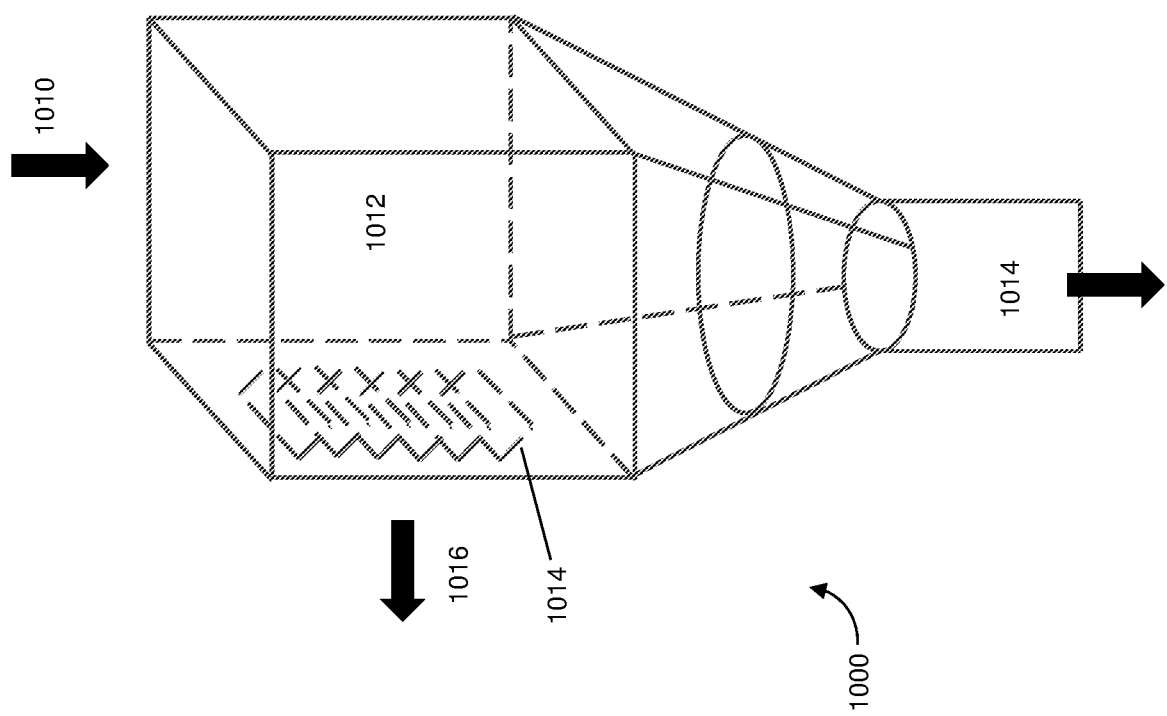

Referring now to FIG. 5, a louver separator for use in accordance with embodiments herein is illustrated. Similar to other separators illustrated and described, the louver separator 1000 may be used for separating catalysts or other particles based on size and/or density. The louver separator 1000 may include a vertical inlet 1010 connected to a chamber 1012 where one or more vertical sides 1014 of the chamber are equipped with narrow slot outlets 1016, which may be described as louvers. The number of louvers may vary depending on the application, such as the desired particle mixture to be separated, and the angle of the louver may be adjustable in order to control the amount of vapor passing through and leaving the louver outlets. The chamber 1012 is also connected to a first vertical outlet 1014 at the bottom of the chamber.

Processes herein may utilize the louver separator 1000 to segregate larger and/or denser particles from smaller and/or less dense particles contained in a carrier gas, such as a hydrocarbon reaction effluent. The louver separator 1000 may be configured to: separate at least a portion of the second particle type from the carrier gas and the first particle type, recover the second particle type via the first vertical outlet 1014 and recover the carrier gas and the first particle type via the louver outlets 1016. The separator may also include a distributor (not illustrated) disposed within or proximate the first vertical outlet for introducing a fluidizing gas, facilitating additional separation of the first particle type from the second particle type.

Figure 6:
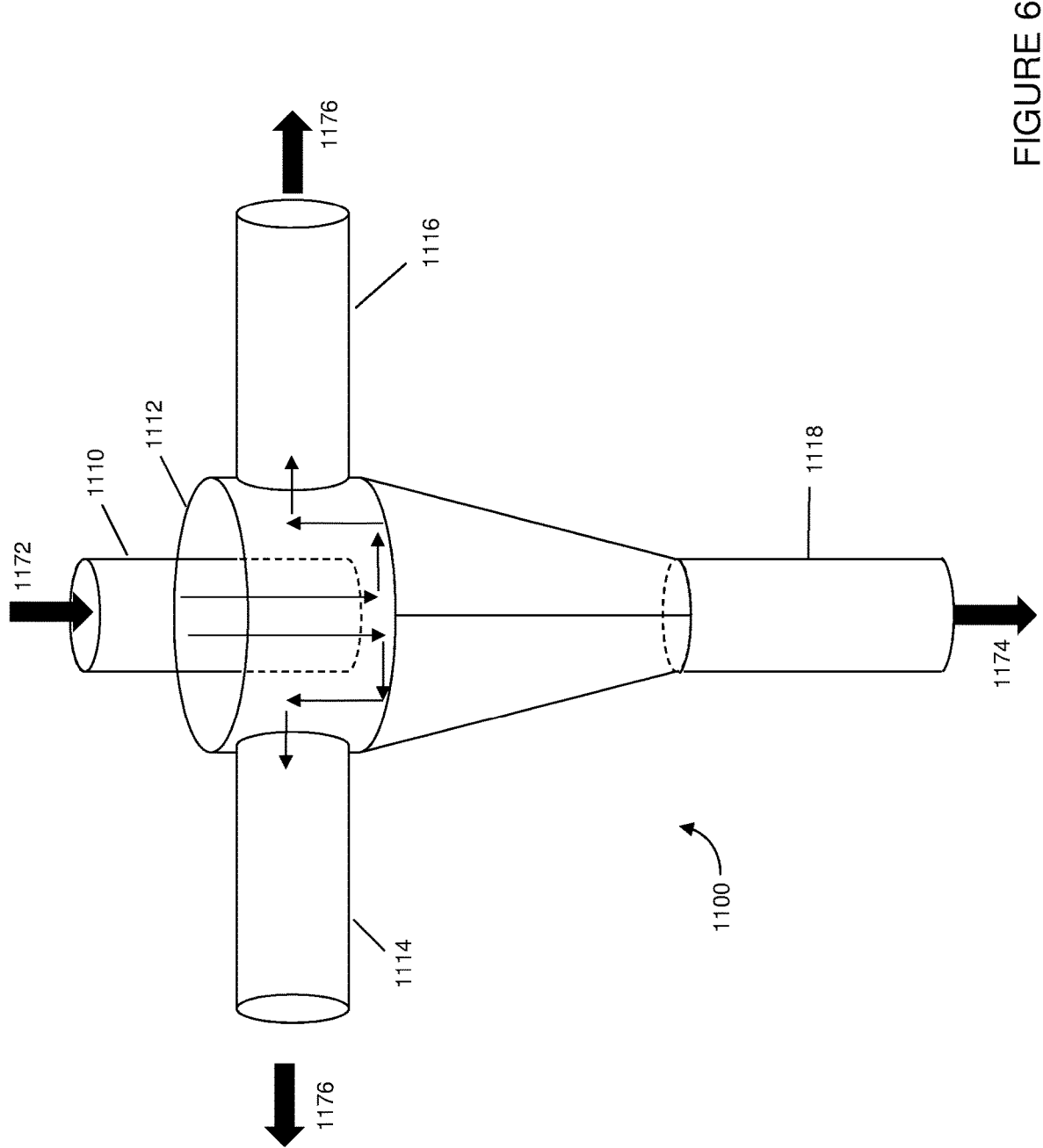

Referring now to FIG. 6, an inertial separator 1100 for use in accordance with embodiments herein is illustrated. Similar to other separators illustrated and described, the inertial separator 1100 may be used for separating catalysts or other particles based on size and/or density. The separator may include an inlet 1110 at the top of and extending into a chamber 1112. In some embodiments, the height or disposition of inlet 1110 within chamber 1112 may be adjustable. The separator may also include one or more side outlets 1114, 1116, such as one to eight side outlets, and a vertical outlet 1118. The separator may also include a distributor (not illustrated) disposed within or proximate the vertical outlet 1118 for introducing a fluidizing gas.

A mixture 1172 of solid particles or catalysts with different sizes is introduced along with a carrier gas stream through inlet 1110. The gases in the mixture 1172 are preferentially directed toward outlets 1114, 1116 based on pressure differentials, and inertial separation forces are applied on the solids by making the particles and carrier gas turn from the extended inlet 1110 within chamber 1112 to flow toward outlets 1114, 1116, the inertial forces separating the different sizes/densities of particles. Larger and/or heavier solid particles 1174 preferentially go downward in sections 1118 to a standpipe or dipleg (not shown) connected to the base of the separator, while lighter or smaller solid particles 1176 are preferentially carried along with the gas stream to outlets 1114, 1116, where the mixture of small particles and gases may be recovered.

In each of the separators described herein, by controlling the gas flow rates entering the downward standpipe/separation chamber and exiting the main gas stream outlet, the overall separation efficiency of the separator and the selectivity to separate heavier and/or larger particles from lighter or smaller particles can be manipulated. This extends to a fully sealed dipleg where the only gas stream exiting the dipleg are those entrained by the exiting solid/catalyst flow.

In some embodiments, a gas sparger or extra steam/inert gas may be provided proximate a top of the heavy/dense particle outlet section, such as near a top of the standpipe inlet. The additional lift gas provided within the separator may further facilitate the separation of heavier and/or larger solid particles from lighter or smaller solid particles, as the extra gas may preferentially lift lighter solid particles to the gas outlets, resulting in better solid classification.

The particle separators described herein may be disposed external or internal to a vessel. Further, in some embodiments, the large/dense particle outlets of the particle separators may be fluidly connected to an external vessel, providing for selective recycle or feed of the separated particles to the desired reactor, so as to maintain a desired catalyst balance, for example.

The various modes of operation described above may allow an operator to vary the system operations to provide a desired product mixture, accounting for availability of feedstocks, demand for particular products or product mixtures, as well as maintenance requirements. Such process flexibility may allow for an operator to operate the second reactor during a first period of time, and to operate the particle cooler during a second period of time. Additionally, or alternatively, an operator may choose, during a third period of time, to operate the system with both reactor 32 and the particle cooler 70 in operation. Embodiments herein thus provide a plant operator the flexibility needed to effectively operate the plant, enhance production of olefins and light hydrocarbons as needed, and to adjust operations based on product demand.

Embodiments disclosed herein, by the methods described above, significantly increase the concentration of desired catalysts in the secondary reactor (vessel 32), consequently increasing light olefin yield. In addition, this process also serves as a method to decouple the withdrawal and addition of the ZSM-5 and ZSM 5-11 with the withdrawal and addition of FCC catalyst. In summary, the FCC process presented in this disclosure creates a desired ZSM-5 or ZSM-11 catalyst additive rich environment in the secondary reactor 32, which could preferentially convert light naphtha products, such as those derived from primary reactor, to improve light olefin yield while simultaneously maximizing middle distillate yield by applying optimum operation condition in the primary reactor or riser.

Another benefit of embodiments disclosed herein is that the integrated two-reactor scheme overcomes the heat balance limitations in the stand alone $C_4$/naphtha catalytic cracking processes. The secondary (mixed flow) reactor acts as a heat sink due to integration with the catalyst regenerator, minimizing the requirement of catalyst cooler while processing residue feed stocks.

The product vapors from the secondary reactor are transported into the first stage reactor/disengaging vessel or reaction termination device wherein these vapors are mixed and quenched with the products from the first stage and or external quench media such as LCO or steam to minimize the unwanted thermal cracking reactions. Alternatively, the product outlet line of the secondary reactor/solids separator can also be used to introduce additional quantity of heavy feed or re-route part of the feed from the first stage reactor (the riser reactor). This serves two purposes: (1) the catalyst in the solids separator vapor outlet line is predominantly Y-type zeolite/conventional FCC catalyst that is preferred to crack these heavy feed molecules into middle distillates, and (2) such cracking reaction is endothermic that helps in reducing the temperature of the outgoing product vapors and also residence time.

In some embodiments disclosed herein, an existing FCC unit may be retrofitted with a secondary reactor as described above. For example, a properly sized reactor may be fluidly connected to an existing catalyst regeneration vessel to provide catalyst feed and return from the mixed flow vessel, and fluidly connected to an existing disengagement vessel to separate the hydrocarbon products and catalysts. In other embodiments, a mixed flow reactor may be added to a grass-roots FCC unit that is aimed at operating in gasoline mode, light olefins mode, or diesel mode.

The reactor system described above with respect to FIGS. 1 and 2 related primarily to light olefins production, and advantageous concentration of a catalyst in a mixed catalyst system to enhance reactivity and selectivity of the system. Such a reactor system may also be used for other mixed catalyst systems, where concentration of one of the catalysts may be advantageous.

Embodiments herein may utilize various types of catalysts or particles to perform desired reactions, where a common regenerator may be used to regenerate the mixture of catalysts, and a separator is advantageously located to enrich one or more reactors with a particular catalyst contained in the mixture of catalysts. Embodiments herein may be used to improve unit operations, and enhance the selectivity and flexibility of the reaction systems, such as for applications including light olefins production, gasoline desulfurization, and heavy oil processing.

Light olefins production may include various light, medium, and heavy hydrocarbon feeds to the riser, as described above. Feeds to the second reactor 32 may include naphtha, such as straight run naphtha or recycle cat naphtha, among other feeds. The catalyst mixture for light olefins production may include a smaller and/or less dense catalyst, such as an FCC catalyst (zeolite Y, for example), and a heavier/denser catalyst, such as ZSM-5 or ZSM-11, among other combinations. Other cracking catalysts may also be used Various catalysts for the cracking of hydrocarbons are disclosed in U.S. Pat. Nos. 7,375,257, 7,314,963, 7,268,265, 7,087,155, 6,358,486, 6,930,219, 6,809,055, 5,972,205, 5,702,589, 5,637,207, 5,534,135, and 5,314,610, among others.

Embodiments directed toward gasoline desulfurization may include various light, medium, and heavy hydrocarbon feeds to the riser, as described above. Feeds to the second reactor 32 may also include naphtha, such as straight run naphtha or recycle cat naphtha, among other feeds. The catalyst mixture for light olefins production may include a smaller and/or less dense catalyst, such as an FCC catalyst (zeolite Y, for example), and a larger and/or denser catalyst, with desulfurization functionality such as a $MgO/Al_2O_3$ with various metals promotion. Other desulfurization catalysts may also be used as disclosed in U.S. Pat. Nos. 5,482,617, 6,482,315, 6,852,214, 7,347,929 among others. In some embodiments, the catalyst mixture may include a cracking catalyst composition having desulfurization activity, such as those disclosed in U.S. Pat. No. 5,376,608, among others.

Embodiments directed toward heavy oil processing may include various light, medium, and heavy hydrocarbon feeds to the riser, as described above. Feeds to the second reactor 32 may include hydrocarbons or hydrocarbon mixtures having boiling points or a boiling range above about 340° C. Hydrocarbon feedstocks that may be used with processes disclosed herein may include various refinery and other hydrocarbon streams such as petroleum atmospheric or vacuum residua, deasphalted oils, deasphalter pitch, hydrocracked atmospheric tower or vacuum tower bottoms, straight run vacuum gas oils, hydrocracked vacuum gas oils, fluid catalytically cracked (FCC) slurry oils, vacuum gas oils from an ebullated bed hydrocracking process, shale-derived oils, coal-derived oils, tar sands bitumen, tall oils, bio-derived crude oils, black oils, as well as other similar hydrocarbon streams, or a combination of these, each of which may be straight run, process derived, hydrocracked, partially desulfurized, and/or partially demetallized streams. In some embodiments, residuum hydrocarbon fractions may include hydrocarbons having a normal boiling point of at least 480° C., at least 524° C., or at least 565° C. The catalyst mixture for heavy hydrocarbon processing may include a smaller and/or less dense catalyst, such as an FCC catalyst (zeolite Y, for example), and a larger and/or denser catalyst, such as an active matrix catalyst, a metals trapping catalyst, a coarse/dense Ecat (equilibrium catalyst), a matrix or binder type catalyst (such as kaolin or sand) or a high matrix/zeolite FCC catalyst. Other cracking catalysts may also be used, such as, for example, one or more of those disclosed in U.S. Pat. Nos. 5,160,601, 5,071,806, 5,001,097, 4,624,773, 4,536,281, 4,431,749, 6,656,347, 6,916,757, 6,943,132, and 7,591,939, among others.

Systems herein may also be utilized for pre-treatment of a heavy crude or virgin crude, such as a crude oil or bitumen recovered from tar sands. For example, reactor 32, such as that in FIG. 1 or 2, among others, may be used to pre-treat the bitumen, prior to further processing of the treated heavy crude in downstream operations, which may include separation in a downstream separation system and recycle of one or more fractions for further conversion in reactor 3. The ability to pre-treat the heavy crude with a preferred particle within a particle or catalyst mixture may advantageously allow integration of heavy crude processing where it otherwise would be detrimental to catalyst and overall system performance.

Embodiments herein describe the catalyst mixture being separated by the separator and the effective preferential concentration of a catalyst within the mixture in a reactor. As illustrated in the Figures, the catalyst being concentrated in the reactor is illustrated as being returned from the separator proximate the top of the reactor or vessel. Embodiments herein also contemplate return of the catalyst from the separator to a middle or lower portion of the reactor, and where the catalyst is returned may depend on the hydrocarbon feeds being processed, the catalyst types in the mixture, and the desired catalyst gradient within the reactor vessel. Embodiments herein also contemplate return of the catalyst to multiple locations within the reactor. While providing the ability to enhance the concentration of a particular catalyst or particle within a mixture in a given reactor, embodiments herein may also be used for a one catalyst system; the particle separators and systems described herein may increase the catalyst/oil ratio, which enhances catalytic contact time.

As described for embodiments above, a second reactor is integrated with a FCC riser reactor and separation system. This reactor is in flow communication with other vessels, allowing selective catalytic processing and integrated hydrocarbon product quenching, separation and catalyst regeneration. Such an integrated reactor system offers one or more of the above advantages and features of embodiments of the processes disclosed herein may provide for an improved or optimal process for the catalytic cracking of hydrocarbons for light olefin production.

Embodiments herein may employ two types of catalyst particles, such as Y-zeolite/FCC catalyst of smaller particle size and/or less density and ZSM-5 particles larger in size and/or denser than the former. A separator with selective recycle may be utilized to preferentially segregate the Y-zeolite from ZSM-5 catalyst. Use of such catalyst system allows entrainment of lighter and smaller particles, thereby retaining ZSM-5 type particles within the additional new reactor bed. The reactants undergo selective catalytic cracking in presence of ZSM-5 type catalyst that is preferred to maximize the yield of light olefins from $C_4$ and naphtha feed streams. The separator is a device which can facilitate the separation of two types of catalysts due to the difference in their particle size and/or density. Examples of separators with selective recycle may be a cyclone separator, a screen separator, mechanical sifters, a gravity chamber, a centrifugal separator, an in-line or pneumatic classifier, or other types of separators useful for efficiently separating particles based on size and/or hydrodynamic properties. The separator is connected to the top of the second reactor which is in flow communication with second reactor as well as regenerator and first reactor/stripper.

The reactor may be provided with baffles or modular grid internals. This provides intimate contact of catalyst with hydrocarbon feed molecules, helps in bubble breakage and avoiding bubble growth due to coalescence, channeling or bypassing of either catalyst or feed.

Conventionally, fresh catalyst make-up for maintaining the catalyst activity is introduced to the regenerator bed using plant air. In contrast, it is proposed to inject the desired high concentration catalyst/additive directly into the second reactor bed using steam or nitrogen as conveying media. This helps to produce incremental increases in concentration and favorable selectivity.

The reactor configurations described herein provide enough flexibility and operating window to adjust operating conditions such as weight hourly space velocity (WHSV), catalyst and hydrocarbon vapor residence time, reaction temperature, catalyst/oil ratio, etc. As for example, in some embodiments, the second reactor top/bed temperature is controlled by adjusting catalyst flow from regenerator which indirectly controls the catalyst/oil ratio. Whereas reactor bed level may be controlled by manipulating the spent catalyst flow from reactor to regenerator, which controls the WHSV and catalyst residence time.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:
1. A system for processing hydrocarbons, comprising:
   a riser reactor configured to contact a mixture of first particles and second particles with a hydrocarbon feedstock to convert at least a portion of the hydrocarbon feedstock and to recover a riser reactor effluent comprising mixed hydrocarbons and the mixture of the first and second particles, wherein the first particle has a smaller average particle size and/or is less dense than the second particle, and wherein the first particle and second particle may independently be catalytic or non-catalytic particles;
   a reactor configured to contact a mixture comprising the first particles and the second particles with a second hydrocarbon feedstock to convert at least a portion of the second hydrocarbon feedstock, wherein the reactor is fluidly connected to:
      an overhead product line for recovering from the reactor a reactor effluent comprising first particles, a first portion of the second particles, and hydrocarbons;
      a bottoms product line for recovering from the reactor a second stream comprising a second portion of the second particles;
   a particle separator configured to separate second particles from the reactor effluent, and to produce a hydrocarbon effluent comprising the hydrocarbons and the first particles and a second stream comprising the separated second particles;
   a feed line for returning the separated second particles from the particle separator to the reactor;
   a separation system configured to receive the hydrocarbon effluent and the riser reactor effluent and to separate: (i) the first particles from the hydrocarbons in the hydrocarbon effluent, and (ii) the mixture of first and second particles from the mixed hydrocarbons in the riser reactor effluent, producing (a) a combined hydrocarbon effluent stream and (b) a mixture of first and second particles;
   a regenerator for regenerating the mixture of first and second particles recovered in the separation system;
   a particle cooler configured to exchange heat between a heat exchange medium and, alternately, intermittently, or at the same time, (i) hot regenerated particles from the catalyst regenerator comprising a mixture of first and second particles, and (ii) second catalyst particles recovered via the bottoms product line;
   a flow line for recovering cooled particles from the particle cooler and feeding the cooled particles to the regenerator.
2. The system of claim 1, further comprising:
   a stripper intermediate the separation system and the regenerator for stripping additional hydrocarbons from the mixture of first and second particles and feeding the stripped particles to the regenerator.
3. The system of claim 1, further comprising:
   a second separation system for separating the combined hydrocarbon effluent stream recovered from the sepa- ration system into two or more hydrocarbon fractions including a naphtha fraction; and
a feed line for feeding the naphtha fraction to the reactor as the hydrocarbon feedstock.

4. The system of claim 1, further comprising:
a first feed line for feeding fresh second catalyst to the reactor;
a second feed line for feeding fresh first catalyst to the regenerator.

5. The system of claim 1, further comprising a flow control system and associated valves configured to selectively direct a flow of: (a) first and second particles from the regenerator to the particle cooler, (b) first and second particles from the regenerator to the reactor, and/or (c) second particles from the reactor to the particle cooler.

6. A process for the conversion of hydrocarbons, comprising:
feeding a hydrocarbon feedstock and a mixture of first particles and second particles to a riser reactor, wherein the first particle has a smaller average particle size and/or is less dense than the second particle, and wherein the first particle and second particle may independently be catalytic or non-catalytic particles;
contacting the mixture of first and second particles with the second hydrocarbon feedstock to crack the hydrocarbon feedstock and form a riser reactor effluent comprising hydrocarbons and a mixture of first and second particles;
feeding the riser reactor effluent to a separator to separate the first and second particles from the hydrocarbons;
recovering a hydrocarbon product from the separator;
feeding the separated first and second particles to a regenerator;
regenerating the first and second particles in the regenerator;
during a first period of time:
feeding regenerated first particles and second particles from the regenerator to a reactor;
feeding a hydrocarbon feedstock to the reactor and contacting the hydrocarbon feedstock with the regenerated first and second particles;
recovering an overhead product from the reactor comprising a converted hydrocarbon effluent, at least a portion of the second particles, and the first particles;
separating the second particles from the overhead product to provide a first stream comprising the first particles and the converted hydrocarbon effluent and a second stream comprising the separated second particles;
feeding the first stream to the separator; and
returning the separated second particle in the second stream to the reactor; and
during a second period of time:
feeding regenerated first particles and second particles from the regenerator to a particle cooler;
in the particle cooler, exchanging heat between a heat exchange medium and the regenerated first particles and second particles;
recovering cooled particles from the particle cooler and feeding the cooled particles to the regenerator.

7. The process of claim 6, further comprising recovering a bottoms product from the reactor comprising second particles.

8. The process of claim 7, further comprising stripping additional hydrocarbons from the second particles in the reactor and feeding the stripped particles to the regenerator.

9. The process of claim 6, further comprising:
feeding fresh second particles to the reactor;
feeding fresh first particles to the regenerator.

10. The process of claim 6, further comprising:
separating the hydrocarbon products into two or more hydrocarbon fractions including a naphtha fraction; and
feeding the naphtha fraction to the reactor as the hydrocarbon feedstock.

11. The process of claim 6, further comprising, during a third period of time:
feeding second particles from the reactor to the particle cooler; and
recovering second particles from the particle cooler.

12. The process of claim 11, further comprising feeding the recovered second particles to the regenerator.

13. The process of claim 6, further comprising, during a third period of time:
feeding regenerated first particles and second particles from the regenerator to both the reactor and the particle cooler, and concurrently:
operating the reactor as for the first period of time; and
operating the particle cooler as for the second period of time.

* * * * *